(12) United States Patent
Senechal et al.

(10) Patent No.: US 11,548,624 B2
(45) Date of Patent: Jan. 10, 2023

(54) METHOD OF MOVING DOORS OF A WELL FOR AN AIRCRAFT UNDERCARRIAGE

(71) Applicant: SAFRAN LANDING SYSTEMS, Vélizy-Villacoublay (FR)

(72) Inventors: Yannick Senechal, Moissy-Cramayel (FR); Vincent Pascal, Moissy-Cramayel (FR); Thierry Blanpain, Moissy-Cramayel (FR); Aurélien Doux, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 173 days.

(21) Appl. No.: 16/445,013

(22) Filed: Jun. 18, 2019

(65) Prior Publication Data

US 2019/0382102 A1 Dec. 19, 2019

(30) Foreign Application Priority Data

Jun. 19, 2018 (FR) ...................................... 1855410

(51) Int. Cl.
*B64C 25/20* (2006.01)
*B64C 25/26* (2006.01)

(52) U.S. Cl.
CPC .............. *B64C 25/20* (2013.01); *B64C 25/26* (2013.01)

(58) Field of Classification Search
CPC ......... B64C 25/20; B64C 25/26; B64C 25/16; B64C 25/24; B64C 25/04; B64C 25/10; B64D 1/06
See application file for complete search history.

(56) References Cited

U.S. PATENT DOCUMENTS 2,552,843 A * 5/1951 Clifton .................... B64C 25/22
 244/102 R
2,567,114 A * 9/1951 Linn ....................... B64C 25/26
 244/102 SL (Continued)

FOREIGN PATENT DOCUMENTS

EP 2 572 981 A1 3/2013
FR 2 947 526 A1 1/2011

OTHER PUBLICATIONS

French Search Report dated Feb. 11, 2019, issued in corresponding French Application No. 1855410, filed Jun. 19, 2018, 2 pages.

*Primary Examiner* — Medhat Badawi
*Assistant Examiner* — Vicente Rodriguez
(74) *Attorney, Agent, or Firm* — Christensen O'Connor Johnson Kindness PLLC (57) ABSTRACT

A method of moving a door of a well for an aircraft undercarriage during sequences of deploying or retracting the undercarriage includes: using a temporary mechanical connection between the door and the undercarriage that is effective when the undercarriage is close to its retracted position, causing the door to be opened by the undercarriage while the undercarriage is being deployed and causing the door to be closed by the undercarriage while the undercarriage is being retracted, but releasing the door from the undercarriage when the undercarriage is close to its deployed position, and using a door actuator acting on the door to close and open the door when the undercarriage is in its deployed position and the temporary mechanical connection is interrupted.

7 Claims, 9 Drawing Sheets

(56) References Cited

U.S. PATENT DOCUMENTS

| | | | | |
|---|---|---|---|---|
| 2,661,171 | A * | 12/1953 | Allen | B64C 25/26 |
| | | | | 244/102 SL |
| 4,568,045 | A * | 2/1986 | Mayer | B64C 25/26 |
| | | | | 244/102 R |
| 9,102,403 | B2 * | 8/2015 | Filho | B64C 25/16 |
| 2010/0140395 | A1 * | 6/2010 | Amberg | B64C 25/20 |
| | | | | 244/102 R |
| 2013/0249152 | A1 * | 9/2013 | Veerabadran | B64C 1/1407 |
| | | | | 267/140.11 |
| 2015/0166173 | A1 * | 6/2015 | Reynes | B64C 25/16 |
| | | | | 244/129.5 |

* cited by examiner

METHOD OF MOVING DOORS OF A WELL FOR AN AIRCRAFT UNDERCARRIAGE

CROSS REFERENCE TO RELATED APPLICATION

This application claims priority under 35 U.S.C. § 119 to French Patent Application No. 1855410, filed Jun. 19, 2018, which is herein incorporated by reference in its entirety.

BACKGROUND

The present disclosure generally relates to methods of moving a door of a well for an aircraft undercarriage. Generally, aircraft undercarriages are retractable into wheel wells in flight. Such a well is generally closed both by a leg fairing connected to the undercarriage and it remains open when the undercarriage is deployed so that it projects from the well, and also by at least one door that closes a zone of the well that receives the wheels, and that is often closed again once the undercarriage has been deployed.

On aircraft of a certain size, such as commercial transport airplanes, each door is associated with an actuator for moving the door between a closed position and an open position, and with a locking member for holding the door closed in flight. The sequence for deploying the undercarriage is generally as follows:
  unlock the doors;
  open the doors;
  unlock the undercarriage;
  move the undercarriage towards its deployed position;
  lock the undercarriage in the deployed position;
  close the doors; and
  lock the doors.

The sequence for retracting the undercarriage is generally as follows:
  unlock the doors;
  open the doors;
  unlock the undercarriage;
  move the undercarriage towards its retracted position;
  lock the undercarriage in the retracted position;
  close the doors; and
  lock the doors.

In general, each door has its own actuator and its own locking member, thereby leading to hydraulic installations that are complex, having multiple valves that need to be controlled with the above-mentioned sequences.

In certain aircraft that are simpler, a temporary mechanical link between the door and the undercarriage enables the door to be moved while the undercarriage is being deployed. More precisely, a roller secured to the undercarriage engages in a fork pivotally mounted on the structure of the aircraft and connected by a connecting rod to the door so that lowering the undercarriage causes the door to open. At a given position in the travel of the undercarriage, the door reaches an open position abutment, and the roller moves away from the fork as the undercarriage continues to move towards its deployed position. A resilient member holds the door in abutment in the open position. When the undercarriage moves back up, the roller docks with the fork and then causes it to pivot, thereby causing the door to be closed against the resilient member when the undercarriage terminates its travel towards the retracted position. The door is then prestressed in the closed position by the actuator for moving the undercarriage, and it is held in the locked position by the undercarriage being locked. Such a disposition makes it possible to omit an actuator for moving the doors and the associated locking members, but it does not allow the doors to be closed when the undercarriage is in the deployed position.

Unfortunately, closing the doors while the undercarriage is in the deployed position is advantageous, since it serves to reduce the aerodynamic turbulence caused by the well being fully open, it reduces the noise due to that turbulence, and it improves the appearance of the aircraft, in particular on the ground.

In order to mitigate that absence of the well closing when the undercarriage is deployed, proposals are made in Document FR 2,947,526 to associate the doors with the undercarriage by a permanent mechanical connection linking the movement of the doors with the movement of the undercarriage, and arranged to cause the doors to perform a go-and-return movement between the closed and open positions whenever the undercarriage is deployed or retracted. However, that provision is not always possible. Certain well shapes and/or certain linkages for moving the undercarriage do not enable the doors to be caused to open and close by means of a permanent mechanical connection with the undercarriage. In addition, such a permanent mechanical connection makes it necessary to provide disconnection means in order to be able to open the doors and access the wheel well on the ground.

SUMMARY

The present disclosure provides methods of moving doors of an undercarriage well that enable them to be closed while the undercarriage is in the deployed position, while allowing them to be opened easily on the ground in order to inspect the well.

In an aspect, the present disclosure provides a method of moving a door of a well for an aircraft undercarriage during sequences of deploying or retracting the undercarriage. The method includes:
  using a temporary mechanical connection between the door and the undercarriage that is effective when the undercarriage is close to its retracted position, causing the door to be opened by the undercarriage while the undercarriage is being deployed and causing the door to be closed by the undercarriage while the undercarriage is being retracted, but releasing the door from the undercarriage when the undercarriage is close to its deployed position; and
  using a door actuator acting on the door to close and open the door when the undercarriage is in its deployed position and the temporary mechanical connection is interrupted.

Accordingly, the door is initially opened by the undercarriage itself, while it is moving down towards its deployed position. Thereafter, when it is deployed and the temporary mechanical connection is interrupted, the door is closed by the door actuator. This actuator may be of modest size, since it does not need to apply any major prestress on the door as would need to be applied to the door in order to guarantee good closure when flying at high speed. At any time on the ground, personnel can open the door by making use of the door actuator.

In an aspect, the door is closed for flight by way of the temporary connection, with the undercarriage-raising actuator performing this closure and providing the prestress that needs to be applied to the door in order to guarantee that it remains properly closed when flying at high speed. The door is then locked in the closed position by locking the undercarriage in the retracted position.

In an aspect, the door is preferably held in the open or closed position while the undercarriage is deployed by means of an external spring member urging the door towards one or the other of these positions.

In an aspect, a crank is pivotally mounted on a wall of the well and is connected by a connecting rod to the door, the crank being associated with a first mechanical element suitable, when the undercarriage is close to its retracted position, for cooperating with a second mechanical element carried by the undercarriage in order to drive pivoting of the crank. It is then preferable for the door actuator to act on the crank in order to cause it to pivot.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The term "about," "approximately," etc., means plus or minus 5% of the stated value. The term "close to" a certain position means within 5% of that position.

Figure 1:
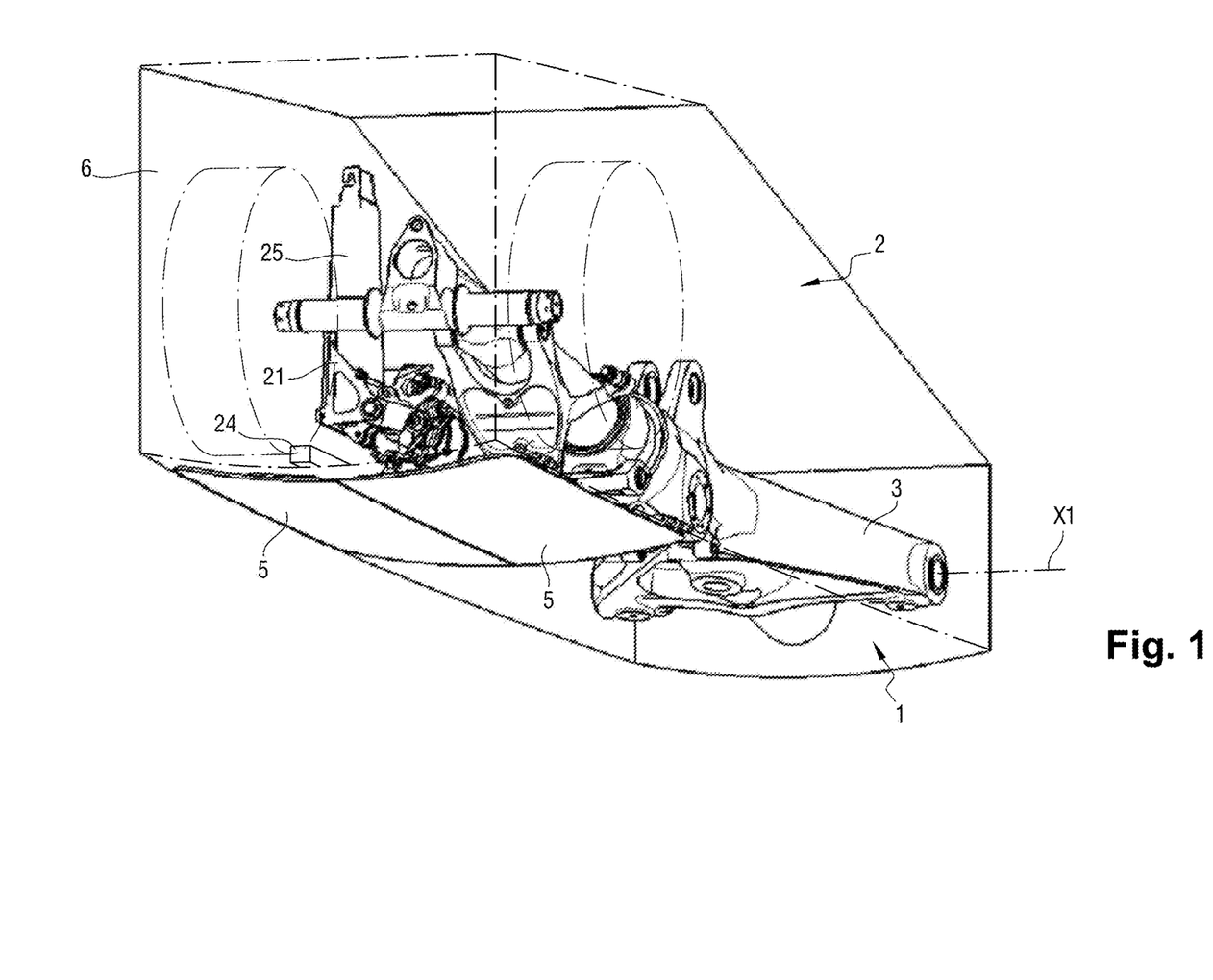
FIG. 1 shows a perspective view of an aircraft well containing an undercarriage locked in the retracted position, and fitted with doors that are shown as being closed and locked, the leg fairing and the wheels carried by the undercarriage being omitted for greater clarity, in accordance with an embodiment of the present disclosure.
Figure 4:
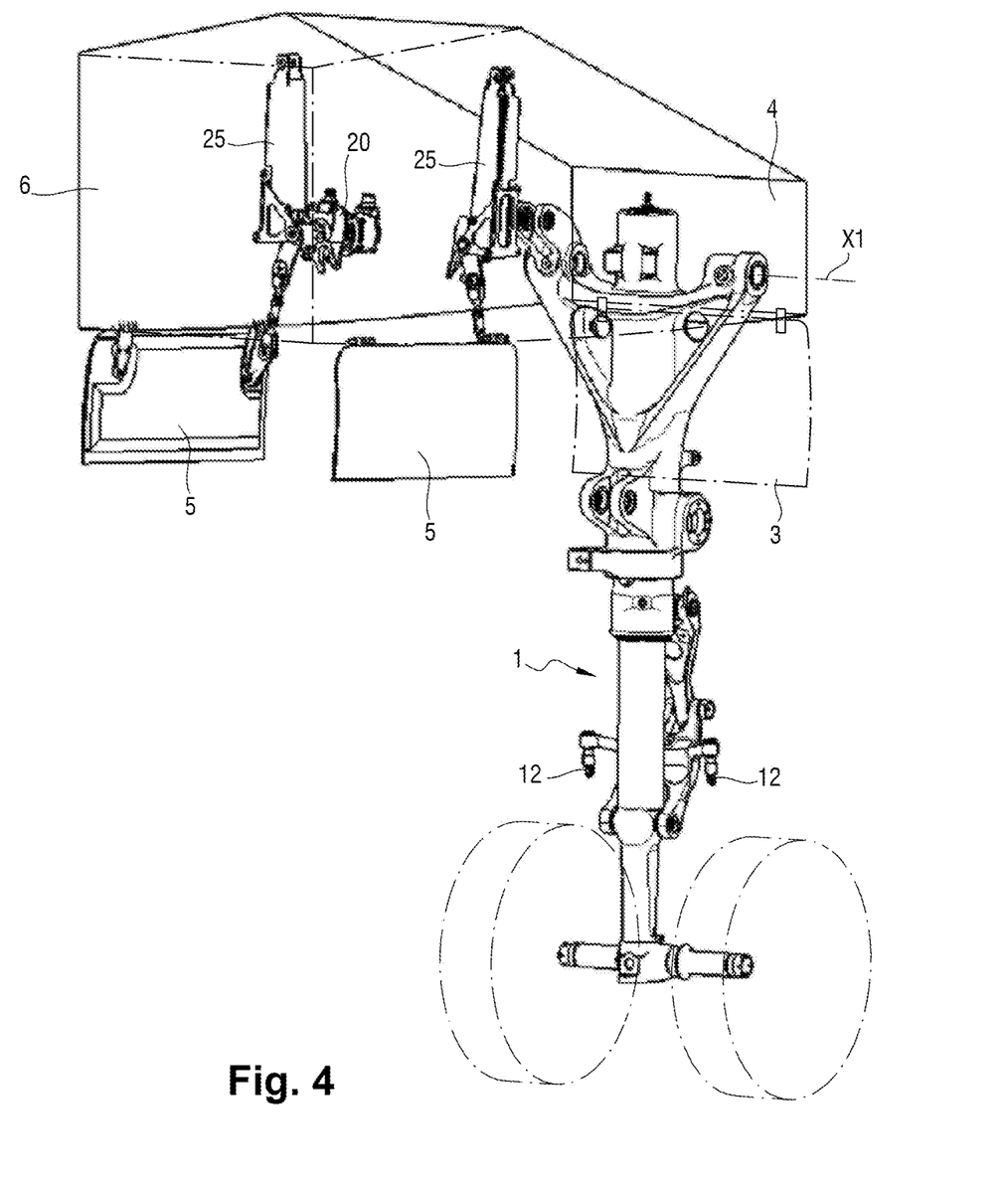
FIG. 4 shows a view analogous to FIG. 3, showing the undercarriage once it has reached its deployed position.
Figure 7:
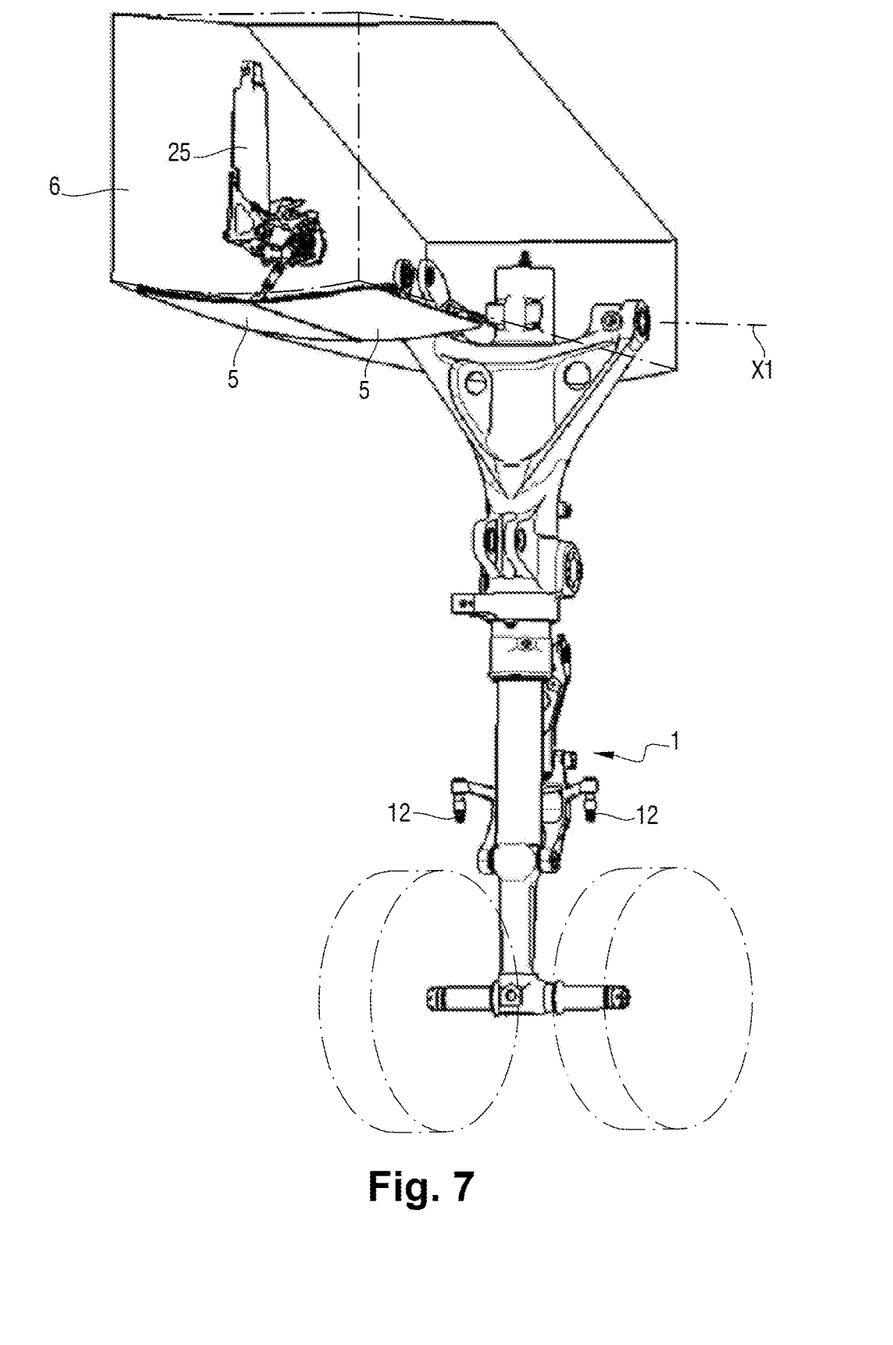
FIG. 7 shows a view analogous to FIG. 3, showing the undercarriage in the deployed position with the doors closed.

With reference to the figures, the present disclosure relates to the sequence for moving an undercarriage 1 that is movably mounted on an aircraft. In this non-limiting example, the undercarriage is mounted to pivot about an axis X1 in order to be moved between a retracted position as shown in FIG. 1 in which the undercarriage (including its wheels, not shown) is contained entirely within a well 2 in the aircraft, and a deployed position as shown in FIGS. 4 and 7, in which the undercarriage is stabilized by a brace member (not shown). A movement actuator serves to move the undercarriage from one of its positions to the other, and a locking hook locks the undercarriage in the retracted position.

The well 2 is closed by a leg fairing 3 visible in FIG. 4 (while in the open position), which fairing is hinged to an end wall 4 of the well and is coupled directly to the undercarriage 1. The leg fairing 3 remains open when the undercarriage 1 is in the deployed position. The well 2 is also closed by doors 5 that are hinged to the side walls 6 of the well 2 and that are moved during sequences of deploying and retracting the undercarriage 1 in a manner that constitutes subject matter of the present disclosure.

Figure 5:
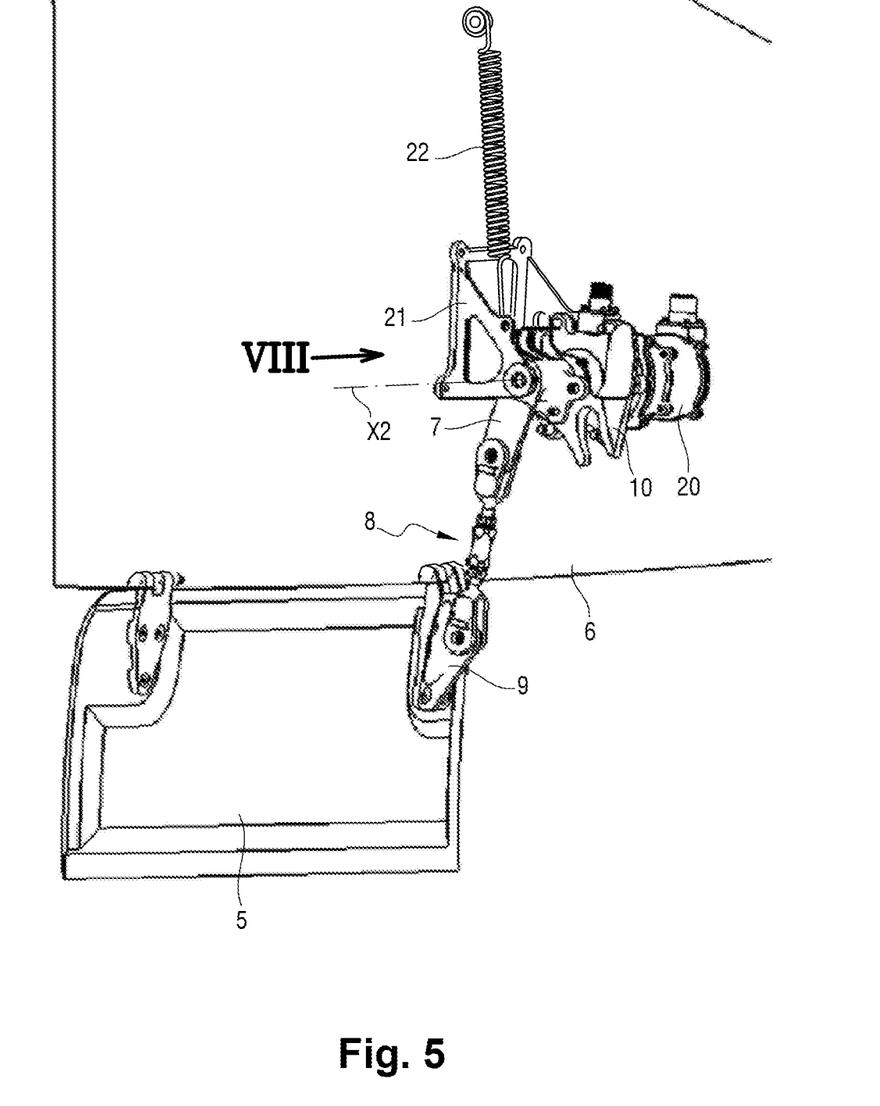
FIG. 5 shows an enlarged view of a portion of FIG. 4, showing the mechanism for moving one of the doors, the door being open.
Figure 6:
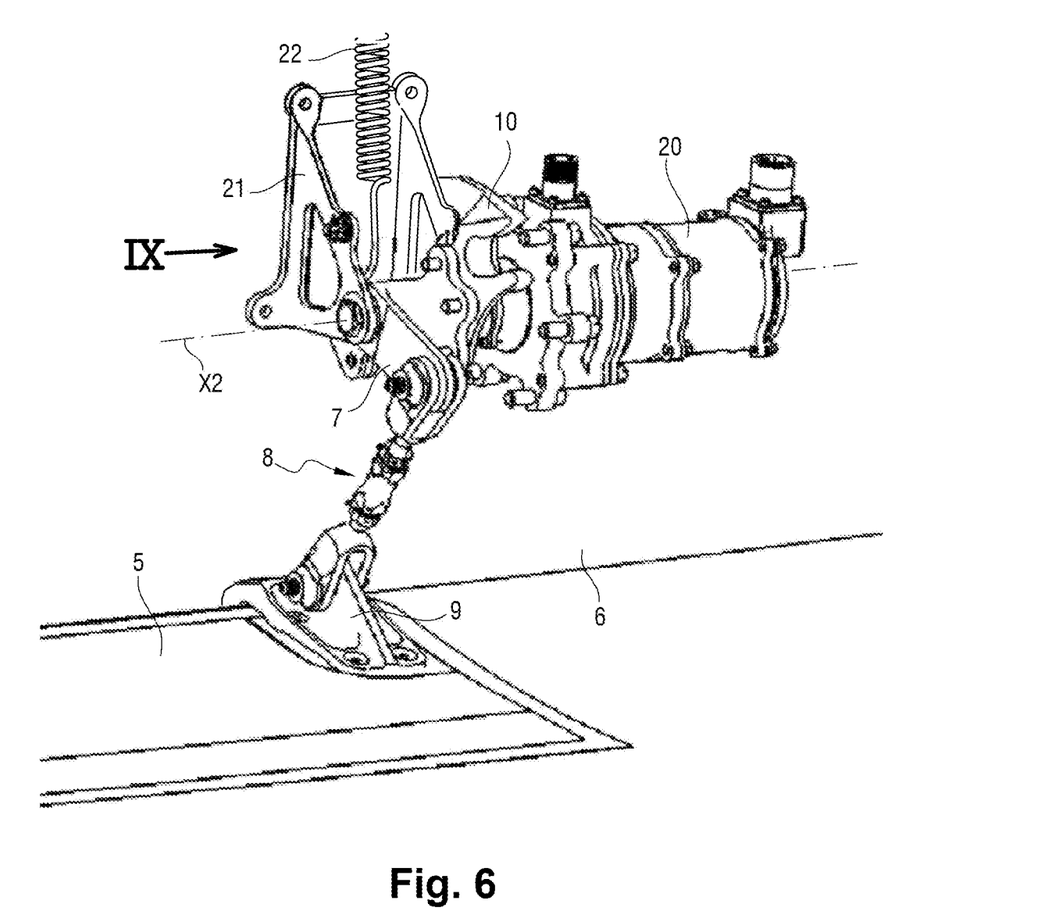
FIG. 6 shows a view analogous to the view of FIG. 5, showing one of the doors that has been closed by the door actuator.
Figure 8:
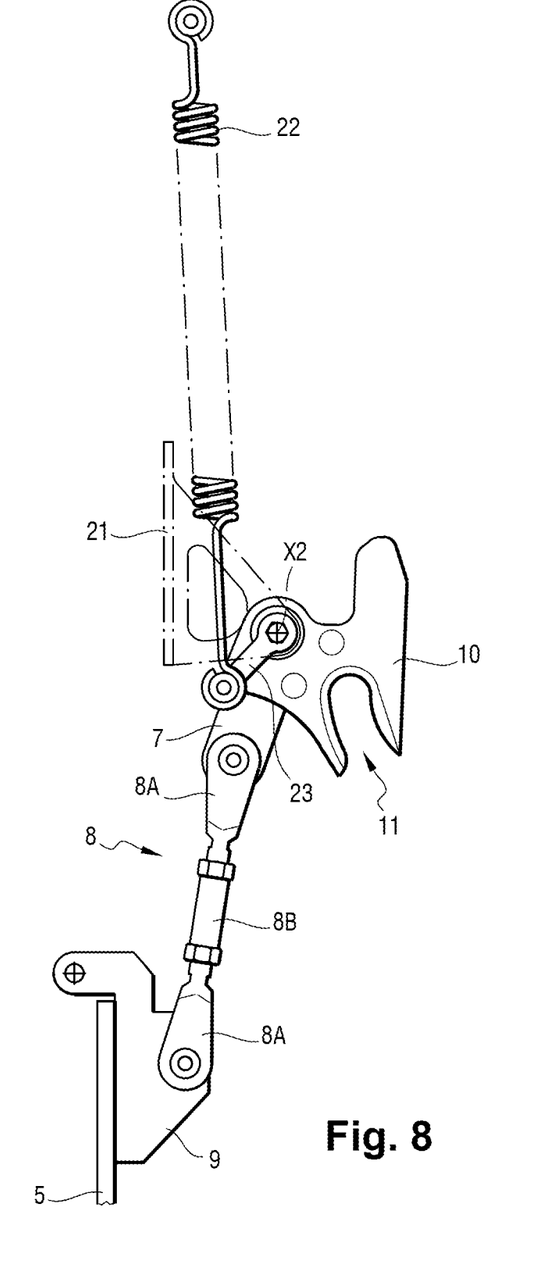
FIG. 8 shows a side view seen looking along arrow VIII of FIG. 5, showing the door actuator mechanism while the door is open.

As can be seen in FIGS. 5 and 6, each door 5 is coupled by a connecting rod 8 to a crank 7 that is pivotally mounted on the side wall 6 to pivot about an axis X2 that is substantially parallel to a hinge axis of the door 5 with the same wall. In this non-limiting example, the crank 7 is secured to a shaft pivotally mounted on a support 21 fitted to the side wall 6. Referring to FIG. 8, each connecting rod 8 has two endpieces 8A, one of which is coupled to the crank 7 and the other of which is coupled to a lug or "horn" 9 of the door 5, the endpieces 8A being screwed onto a body 8B enabling the length of the connecting rod 8 to be finely adjusted. The crank 7 can be moved between a first position shown in FIGS. 5 and 8 in which the crank 7 is substantially in alignment with the connecting rod 8 so as to hold the door 5 in the open position, and a second position shown in FIGS. 6 and 9 in which the crank 7 holds the door 5 in the closed position.

In accordance with the present disclosure, the crank 7 is moved from one of these positions to the other by two techniques or methodologies:

by a temporary connection between the undercarriage 1 and the crank 7, which connection is effective while the undercarriage is close to or in the retracted position. This connection takes place via two mechanical elements that are secured respectively to the crank and to the undercarriage, namely a fork 10 that is constrained to pivot with the crank 7 and that defines a slot 11 suitable, when the roller comes to close to the fork 10, for receiving a roller 12 secured to the undercarriage 1 so that the movement of the undercarriage while it is being moved causes the fork 10 to pivot, and thus pivots the crank 7 and hence the door 5; and by a door actuator 20, specifically a rotary electric actuator secured to the support 21 on which the crank 7 is pivotally mounted, and adapted to pivot the crank 7 when it is powered. In this non-limiting example, the door actuator 20 has an outlet shaft extending along the axis X2 so as to be connected directly to the crank 7. When the door actuator 20 is not powered, it leaves the crank 7 free to pivot.

Figure 9:
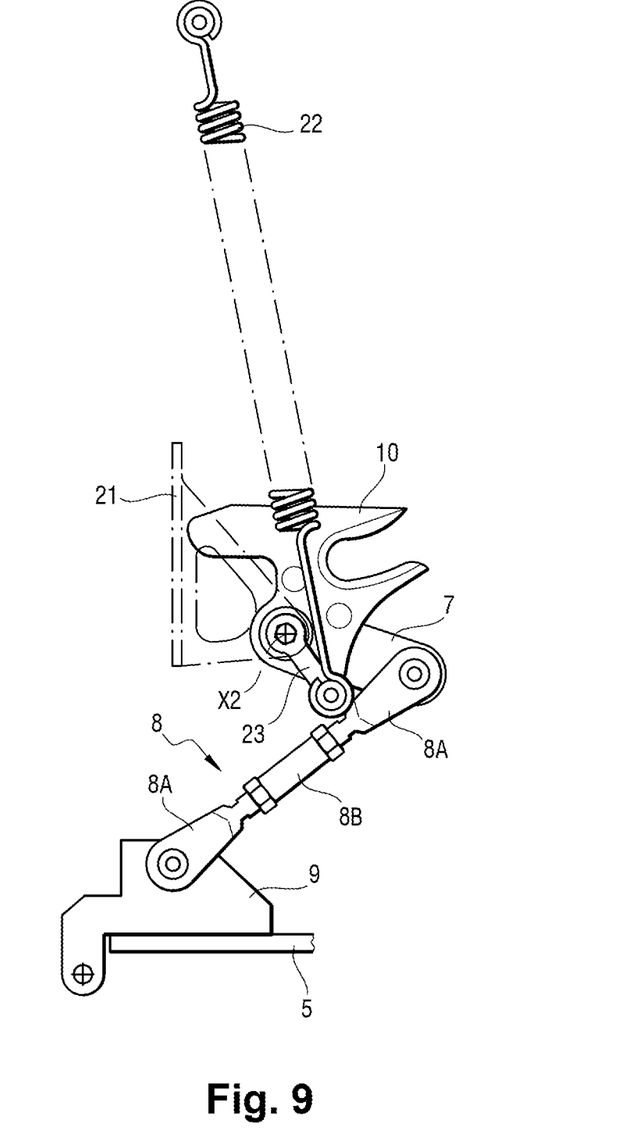
FIG. 9 shows a side view looking along arrow IX of FIG. 6, showing the door actuator mechanism while the door is closed.

As can be seen more clearly in FIG. 8, the door 5 is held in the open position by a spring 22 coupled to a horn 23 that is constrained to pivot with the crank 7 and that holds the crank-and-fork assembly against an abutment of the support 21. The door 5 is held in the closed position:

when the undercarriage 1 is in the retracted position, by the locking hook that holds the undercarriage in the retracted position; and when the undercarriage 1 is in the deployed position, as shown in FIG. 9, by the spring 22 pulling the horn 23 and thus the door 5 so as to hold it against an abutment 24 (visible in FIGS. 1 and 2) that is secured to the front wall of the well 2.

It should be observed that in this non-limiting example the spring 22 is protected by a cover 25 that is fastened to the side wall 6 and that is omitted from FIGS. 5, 6, 8, and 9 for greater clarity.

Figure 2:
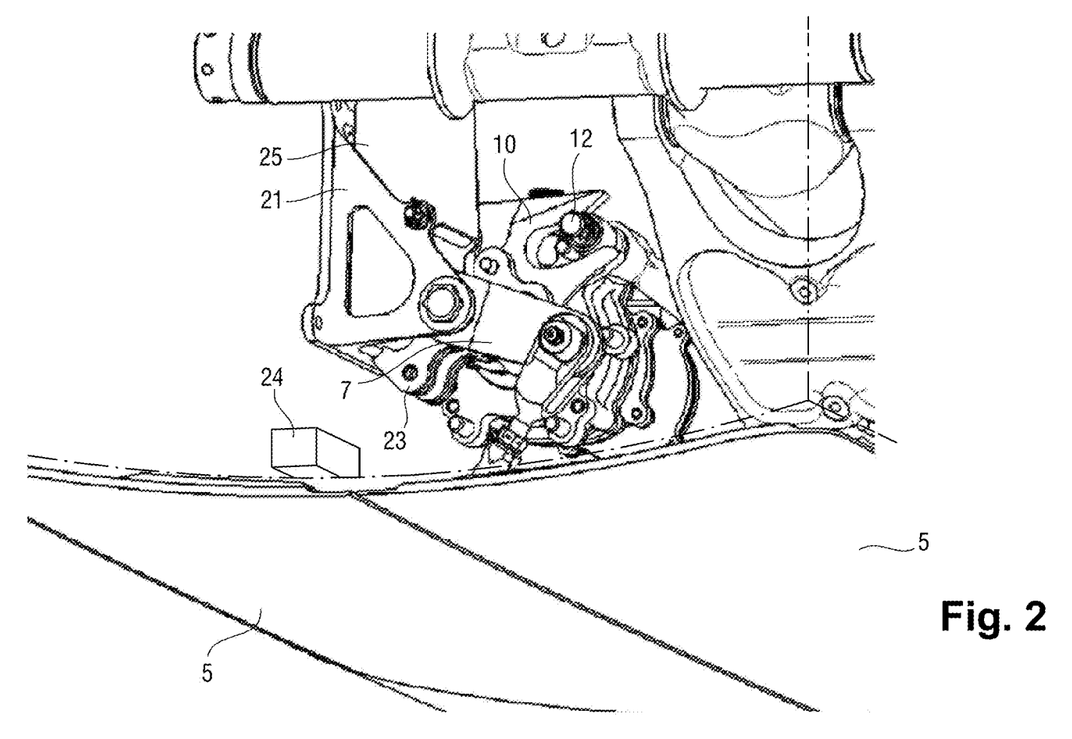
FIG. 2 shows an enlarged view of FIG. 1, showing the mechanism for moving one of the doors.
Figure 3:
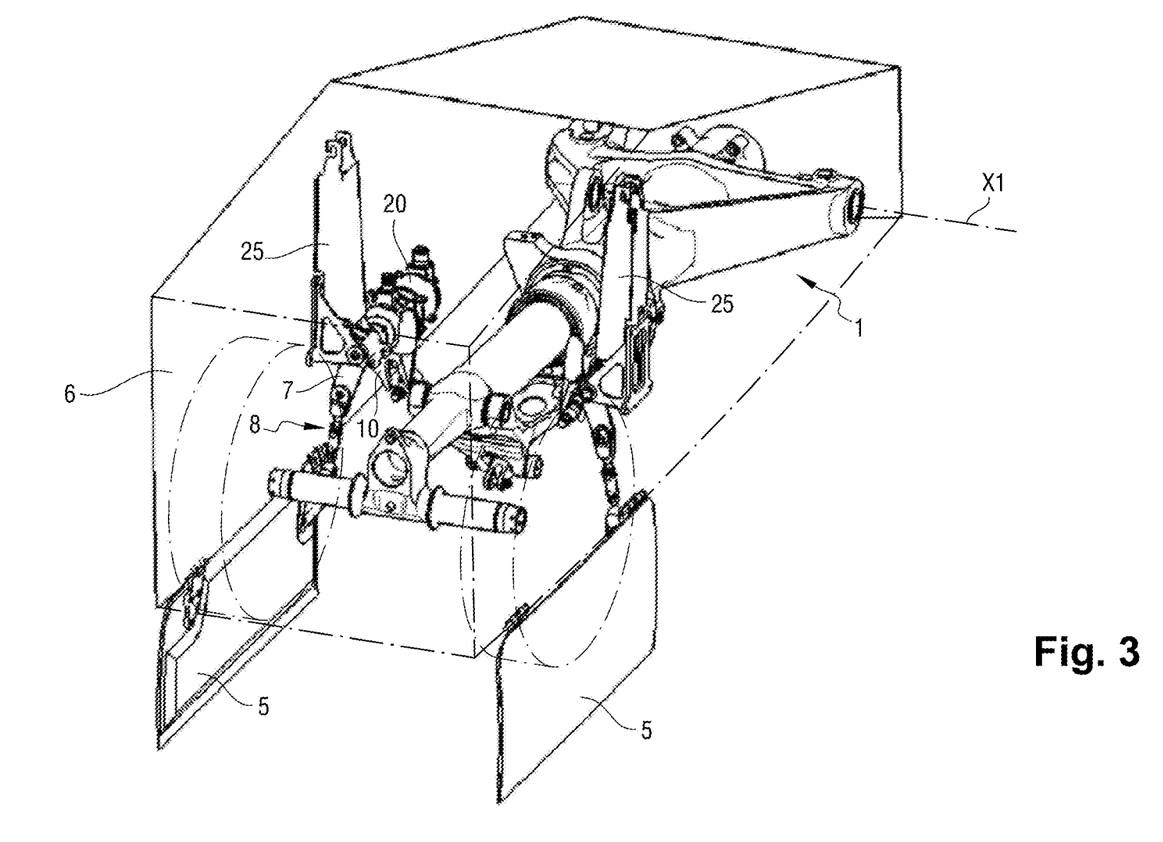
FIG. 3 shows a view analogous to FIG. 1, showing the undercarriage while it is being deployed after the doors have been opened by the undercarriage.

The moving of the doors 5 is described in greater detail below in association with moving the undercarriage from the retracted position to the deployed position. In the situation shown in FIG. 1, in which the undercarriage is locked in the retracted position, the rollers 12 are engaged in the forks 10, such that the cranks 7 are in their second positions and the doors 5 are closed and held prestressed against the abutment 24 by the prestress that was imposed by the undercarriage-moving actuator prior to the undercarriage being locked in position. This situation is shown in FIGS. 1 and 2 where it can be seen that the rollers 12 are pulling the fork 10 and holding the doors 5 in the closed position. When the aircraft pilot seeks to deploy the undercarriage 1, it is unlocked and begins to move downwards under the effect of its own weight, thereby causing the forks 10 to pivot and as a result opening the doors 5. The undercarriage then reaches the situation shown in FIG. 3 in which the rollers 12 secured to the undercarriage 1 have caused the forks 10 to pivot so as to bring the doors 5 into the open position, and the rollers now leave the forks 10 as the undercarriage 1 continues to move downwards. The temporary connection between the doors 5 and the undercarriage 1 is then interrupted. The undercarriage 1 then continues its travel until it reaches the deployed position in which it is stabilized by the brace member. As shown in FIG. 5, the doors 5 remain in the open position under the action of the spring 22. The door actuators 20 are then powered to cause the doors 5 to be closed, as shown in FIG. 6. The situation in which the undercarriage 1 is in the deployed position with the doors being closed is shown in FIG. 7. The doors 5 are held closed by the springs 22, which have no need to impose any major prestress on the doors 5 in order to hold them closed. Under such circumstances, the door actuators 20 may be selected to be of modest power, since they need only the power required for opening and closing the doors while flying at low speed.

Naturally, if it is found to be necessary to inspect the well 2, it is still possible to cause the doors 5 to be open by powering the door actuators 20, either by means of an internal supply of energy, or else by using an external generator.

When the aircraft pilot seeks to retract the undercarriage 1, the door actuators 20 are initially powered so as to open the doors 5. Thereafter, the undercarriage is unlocked and returns towards the retracted position by the undercarriage-moving actuator. On coming close to the retracted position, the rollers 12 secured to the undercarriage 1 dock with the forks 10 and penetrate into their slots 11, thereby causing the forks to pivot so as to close the doors. The undercarriage 1 is then taken to its retracted position, into which it is prestressed by the moving actuator so as to press the doors 5 against the closure abutment 24, after which it is locked in the retracted position.

The present disclosure is not limited to the above description, but on the contrary covers any variant coming within the ambit defined by the claims. In particular, although in this non-limiting example the door actuators are rotary electric actuators, any other type of actuator could be used for moving the doors, providing they do not hinder the doors being actuated by the undercarriage when the undercarriage is close to its retracted position.

Although the doors are held in the open or closed position when the undercarriage is deployed by a spring member 22 external to the actuator, any other holder means could be used, e.g. such as an internal brake in the actuator.

Although each door 5 in this non-limiting example is actuated by a crank-and-connecting-rod mechanism and the door actuator is arranged to cause the crank to pivot, any other arrangement could be used, providing it allows a temporary mechanical connection with the undercarriage and allows the actuator to actuate the door when the temporary mechanical connection is interrupted.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A method of moving a door of a well for an undercarriage of an aircraft during sequences of deploying or retracting the undercarriage, the method comprising:

using a temporary mechanical connection between the door and the undercarriage that is established when the undercarriage is close to a retracted position, causing the undercarriage to open the door when deploying the undercarriage and causing undercarriage to close the door when retracting the undercarriage, but releasing the door from the undercarriage when the undercarriage is close to a deployed position; and using a drive actuator acting on the door to drive the door into a closed position and an open position only when the undercarriage is in the deployed position and the temporary mechanical connection is interrupted, wherein the drive actuator does not oppose movement of the door and wherein the drive actuator remains controllable when said drive actuator is not used to drive said door into the closed position and open position.

2. The method according to claim 1, wherein a crank is pivotally mounted on a wall of the well and is connected by a connecting rod to the door, and wherein the crank is associated with a first mechanical element that is configured to cooperate, when the undercarriage is close to the retracted position, with a second mechanical element carried by the undercarriage in order to drive pivoting of the crank.

3. The method according to claim 2, wherein the first mechanical element is a fork defining a slot in which the second mechanical element engages when it is close to the retracted position in order to drive pivoting of the crank.

4. The method according to claim 2, wherein the door actuator acts on the crank in order to cause said crank to pivot.

5. The method according to claim 1, wherein the door is held in an open position or a closed position while the undercarriage is deployed by a spring member configured to urge the door towards the open position or the closed position, respectively.

6. A method of moving a door of a well for an undercarriage of an aircraft during sequences of deploying or retracting the undercarriage, the method comprising:

using a temporary mechanical connection between the door and the undercarriage, wherein the temporary mechanical connection is configured to connect the door and the undercarriage when the undercarriage is proximal to a retracted position, causing the undercarriage to open the door when deploying the undercarriage and causing the undercarriage to close the door when retracting the undercarriage, and releasing the door from the undercarriage only when the undercarriage is proximal to a deployed position; and using a drive actuator acting on the door to drive the door into a closed position and an open position only when the undercarriage is in the deployed position and the temporary mechanical connection is interrupted, wherein the drive actuator does not oppose movement of the door and wherein the drive actuator remains controllable when said drive actuator is not used to drive said door into the closed position and open position.

7. The method of claim 6, wherein the temporary mechanical connection is configured to connect the door and the undercarriage when the undercarriage is within about ten percent of the retracted position, and wherein releasing the door from the undercarriage occurs when the undercarriage is within about ten percent of the deployed position.

* * * * *